(12) United States Patent
Poland

(10) Patent No.: US 7,169,032 B1
(45) Date of Patent: Jan. 30, 2007

(54) CRUSTACEAN SHELLING TOOL AND PROCESS FOR USE THEREOF

(76) Inventor: Mark A. Poland, 23 Ward Ave., Butler, NJ (US) 07405

( * ) Notice: Subject to any disclaimer, the term of this patent is extended or adjusted under 35 U.S.C. 154(b) by 0 days.

(21) Appl. No.: 11/338,493

(22) Filed: Jan. 23, 2006

Related U.S. Application Data

(62) Division of application No. 10/620,138, filed on Jul. 14, 2003, now Pat. No. 7,014,551.

(60) Provisional application No. 60/395,980, filed on Jul. 16, 2002.

(51) Int. Cl.
*A22C 29/02* (2006.01)

(52) U.S. Cl. ....................................................... 452/3

(58) Field of Classification Search ........ 452/102–105, 452/1–6
See application file for complete search history.

(56) References Cited

U.S. PATENT DOCUMENTS

| | | | |
|---|---|---|---|
| 720,439 A * | 2/1903 | Kadletz et al. ............. | 452/103 |
| 4,172,306 A * | 10/1979 | Hopkins ........................ | 452/6 |
| 4,574,629 A * | 3/1986 | Weng ........................ | 73/146.8 |
| 5,080,629 A * | 1/1992 | Ellison ........................... | 452/6 |
| 5,403,230 A * | 4/1995 | Capriglione, Sr. ............. | 452/6 |
| 6,918,291 B2 * | 7/2005 | Durr et al. .................. | 73/146.2 |
| 6,977,330 B2 * | 12/2005 | Santa Cruz et al. .......... | 84/322 |
| 7,014,551 B1 * | 3/2006 | Poland ........................... | 452/6 |

* cited by examiner

*Primary Examiner*—Thomas Price
(74) *Attorney, Agent, or Firm*—William E. Hein

(57) ABSTRACT

A crustacean shelling tool is employed to quickly and easily crack the underside of the tail shell of a crawfish, for example, to expose the meat contained therein for removal without damage and without loss of the associated succulent juices. The key-like tool includes a handle and an elongate rod extending therefrom. A longitudinal slit extends inwardly from a distal end of the rod to define upper and lower rod forks. An optional finger ring is attached to the handle of the tool by way of a short tether to prevent dropping or misplacement of the tool during the time required to remove and/or eat the meat from one shelled crawfish and to ready the next crawfish for shelling. In use, the lower rod fork of the tool is inserted into the open end of the tail shell such that the underside of the shell is guided into the longitudinal slit a desired distance. Next, the tool is rotated about its longitudinal axis approximately ¼ turn in either direction to thereby crack the underside of the shell and expose the meat contained therein. The tool is then lifted away from the shell and allowed to hang from the finger ring, freeing the user's hands to manually widen the crack in the shell and remove the meat, intact, therefrom.

2 Claims, 1 Drawing Sheet

CRUSTACEAN SHELLING TOOL AND PROCESS FOR USE THEREOF

REFERENCE TO RELATED APPLICATION

This application is a divisional application of allowed prior application Ser. No. 10/620,138 filed on Jul. 14, 2003 now U.S. Pat. No. 7,014,551, the subject matter of which is hereby incorporated by reference.

This application is related to and claims the benefit under 35 U.S.C. 119(e) of U.S. provisional Patent Application Ser. No. 60/395,980 filed Jul. 16, 2002.

BACKGROUND AND SUMMARY OF THE INVENTION

This invention relates generally to crawfish and, more specifically, to a tool and process for removing meat from the tail section of this and other types of crustaceans.

A crawfish most resembles a small Maine lobster. While the Maine lobster contains edible meat in the claws and tail, the only edible meat within a crawfish is found in the tail section. The normal method of eating a crawfish, which requires that the meat be removed from the tail, involves breaking the crawfish at the juncture of the head and tail sections, discarding the head section that contains very little edible meat, and then removing the meat from the tail section. Like lobsters, crawfish turn a bright red color when cooked. The tail is tightly curved, which is a positive indication of freshness. The edible meat is contained within the rigid, plate-like shell of the tail that is extremely resistant to cutting, having a marked brittleness and low ductility. Conventionally, the consumer straigtens the cooked tail with his or her fingers and attemps to squeeze the shell much like squeezing a tube of toothpaste from the bottom. If the crawfish afficionado has developed the right touch of thumb and forefinger, the meat can sometimes be squeezed out. More often than not, however, the meat either breaks, leaving a portion in the shell, or it does not come out at all. In any event, this brute force process also squeezes the succulent juices from the meat, allowing them to drip away and be wasted. At this point, the frustrated diner, whose thumb and forefinger are already likely very sore, is reduced to attempting to piecemeal disassemble a shell structure as impervious as that of a lobster tail, but approximately 1/10th the size.

Various tools are known in the prior art for aiding in the removal of meat from the tail section of crawfish. Exemplary of such tools are those described in U.S. Pat. No. 4,524,490 to Newville and U.S. Pat. No. 6,036,596 to Lay.

The tool described by Newville includes a handle similar to that of an ordinary kitchen tool and a pair of spring-biased, opposed, elongated concave tongs having inwardly curved tips. The tong members are both inserted into the tail section of a crawfish whose head has been removed, such that they pass along the tail meat within the shell. Insertion of the tongs serves to sever the individual ligamentary connections between the crawfish meat and the shell. The tongs are then squeezed tightly together by the user and withdrawn from the shell. Theoretically, the meat will accompany the tongs as they are withdrawn. Unfortunately, this device requires deft manipulation to remove even a portion of the meat. Moreover, the removed meat, being squeezed between the tong members, loses its prized succulent juices in the process.

The tool to which the Lay reference is directed includes a handle and an outwardly protruding wire loop connected thereto. The wire loop is pushed into the crawfish tail shell, following which the handle is variously pushed, pulled, and rotated to supposedly sever the individual ligamentary connections between the meat and the inner surface of the tail shell. The wire loop is then withdrawn from the tail, hopefull dragging some meat with it. This tool is likewise disadvantageous in that it is destructive of the delicate meat and associated succulent juices and likely requires repeated use to remove most of the meat from a single crawfish.

It would therefore be advantageous to provide a shelling tool for crawfish and other crustaceans that facilitates quick and easy removal of the delicate meat and juices contained within the tail shells thereof without damage.

In accordance with the illustrated preferred embodiment of the present invention, a key-like crustacean shelling tool includes a handle and an elongate rod extending outwardly therefrom. A longitudinal slit extending inwardly from a distal end of the rod serves to define upper and lower rod forks. An adjustable finger ring is attached to the handle of the shelling tool by means of a short tether to prevent dropping or misplacement of the tool during the time required to remove and/or eat the meat from one shelled crawfish and to ready the next crawfish for shelling.

The crustacean shelling tool of the present invention is employed to quickly and easily crack the underside of the tail shell of a crawfish, for example, to expose the meat contained therein for easy removal without damage and without the loss of succulent juices contained therein. This process involves inserting the lower rod fork of the shelling tool into the open end of the tail shell such that the underside of the shell is guided into the longitudinal slit of the tool. Following insertion of the lower rod fork to the length of the shell, the tool is rotated about its longitudinal axis approximately ¼ turn in either direction to thereby crack the underside of the shell and expose the meat contained therein. The tool is then lifted away from the shell and allowed to hang from the finger ring, thus freeing the user's hands to widen the crack in the shell, allowing removal of the meat contained therein in its entirety.

DETAILED DESCRIPTION OF THE PREFERRED EMBODIMENT

Figure 1:
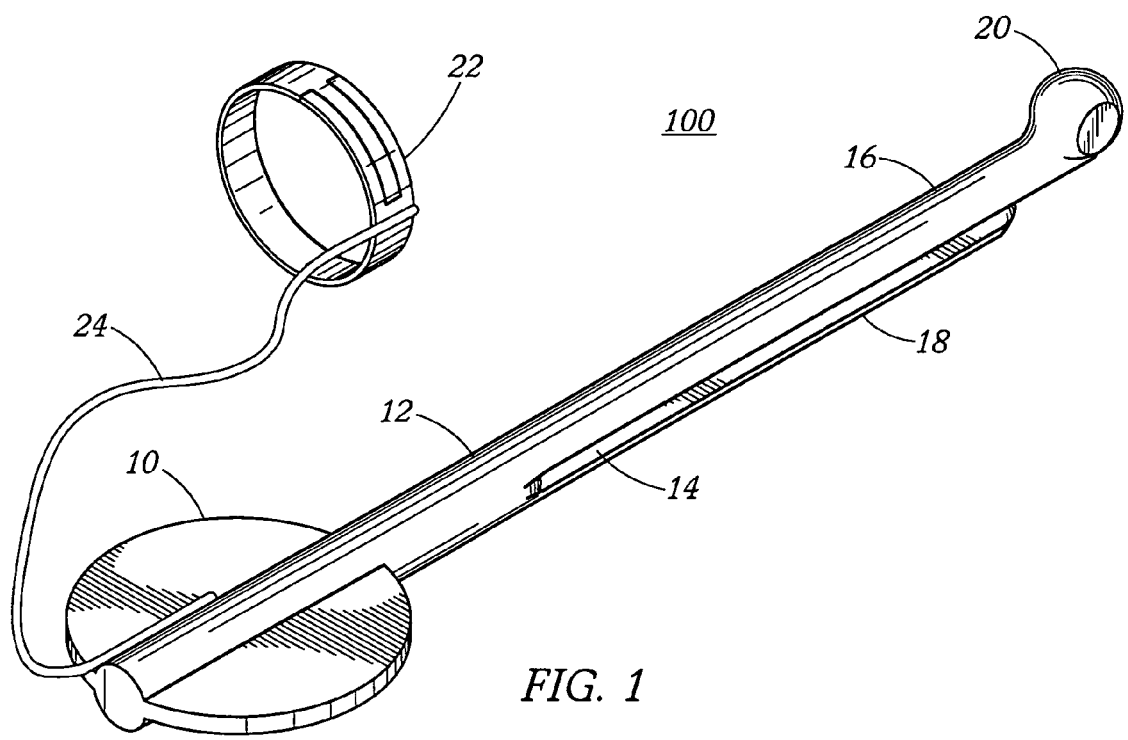
FIG. 1 is an overall pictorial diagram of the crustacean shelling tool of the present invention.
Figure 2:
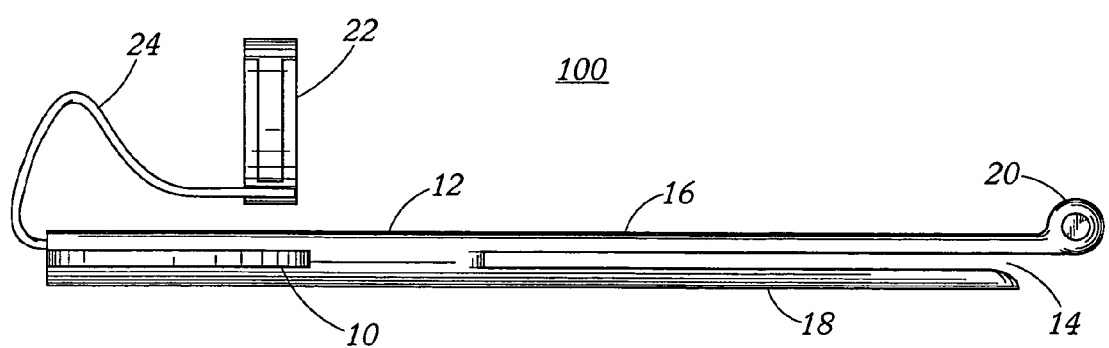
FIG. 2 is a front elevation view of the crustacean shelling tool of FIG. 1.

Referring now to FIGS. 1 and 2, there is shown a crustacean shelling tool 100 having a handle 10 at a proximal end thereof. Handle 10 is preferably in the shape of a flat disc. An elongate rod 12 extends from the handle 10. A longitudinal slit 14 extends inwardly from a distal end of rod 12. The length of rod 12, as well as the length and thickness of slit 14, may be scaled as desired for use with crustaceans of different types. For example, shelling tool 100, if used to shell a lobster tail, would be proportionately larger than if it were to be used to shell a much smaller crawfish tail. Slit 14 in rod 12 defines an upper rod fork 16 and a lower rod fork 18. Upper rod fork 16 terminates in a blunt, somewhat spherical tip 20 that extends slightly beyond the distal end of lower rod fork 18. The distal end of lower rod fork 18 is slightly tapered and rounded.

If shelling tool 100 is to be used to shell crawfish tails, it preferably includes a finger ring 22 that is attached thereto by means of a tether 24, which may simply be a length of cord. Alternatively, tether 24 may be a plastic tether member. Finger ring 22 is conventionally provided to be adjustable in diameter so that it may be fitted to any user. The provision of finger ring 22 allows the user to simply release shelling tool 100 during the final step of removing the meat from a shelled crawfish tail without the sanitation and inconvenience risks associated with dropping it on a table or on the ground. Since each crawfish tail contains only a very small portion of meat, the user is thus able to shell and eat more crawfish in a given amount of time than would otherwise be possible if it were necessary to locate a previously dropped shelling tool before beginning the shelling process on the next crawfish tail.

In use, the crustacean shelling tool 100 of the present invention serves to quickly and easily crack the underside of a tail shell to expose the meat therein for removal without damage and without the loss of succulent juices contained therein. The body of a crustacean such as a crawfish, for example, is first conventionally removed, leaving the meat-containing tail section. The lower rod fork 18 of the crustacean shelling tool 100 is slid into the open end of the tail section such that the underside of the shell is guided into the slit 14 of tool 100, while upper rod fork 16 remains outside the shell. During this step, the blunt tip 20 at the distal end of upper rod fork 16 serves to straighten the otherwise curved tail without breaking the shell. When the lower rod fork 14 of tool 100 has been inserted to the length of the shell, handle 10 is used to rotate the shelling tool 100 about its longitudinal axis approximately ¼ turn in either the clockwise or counterclockwise direction to thereby crack the shell along a generally straight line and expose the meat contained therein. As the meat tends to return to its original curved position, it protrudes from the shell. At this point, the user simply lifts the tool 100 away from the cracked shell and releases it to depend from finger ring 22. The user is then free to use both thumbs to apply pressure on the edges of the tail shell, while supporting the shell with the forefingers held against the opposite side of the shell to thereby effectively widen the crack in the underside of the shell that was previously produced by rotation of the shelling tool 100. By so widening the crack in the tail shell, the meat contained therein is urged therefrom without any damage to or loss of the delicate meat and its associated juices.

I claim:

1. A tool for shelling a crustacean to remove meat from a tail shell thereof, the tool comprising:
    a handle;
    an elongate rod extending away from said handle, said elongate rod being of solid circular cross section and having a longitudinal slit of uniform height and width extending inwardly from a distal end thereof, said uniform height and width prevailing along the entire length of said longitudinal slit, said longitudinal slit defining an upper rod fork of solid semi-circular cross section and a lower rod fork of solid semi-circular cross section, parallel thereto, of said elongate rod, said upper rod fork extending beyond a distal end of said lower rod fork, said upper rod fork terminating in a substantially spherical tip, said handle comprising a flat disc positioned horizontally and lying in the same plane as a horizontal plane in which said slit in said elongate rod lies.

2. A tool as in claim 1, further comprising a finger ring attached to said handle by means of a tether.

* * * * *